Jan. 19, 1960  A. D. LA RUE  2,922,075
RESONANT GRID MAGNETRONS
Filed March 27, 1958
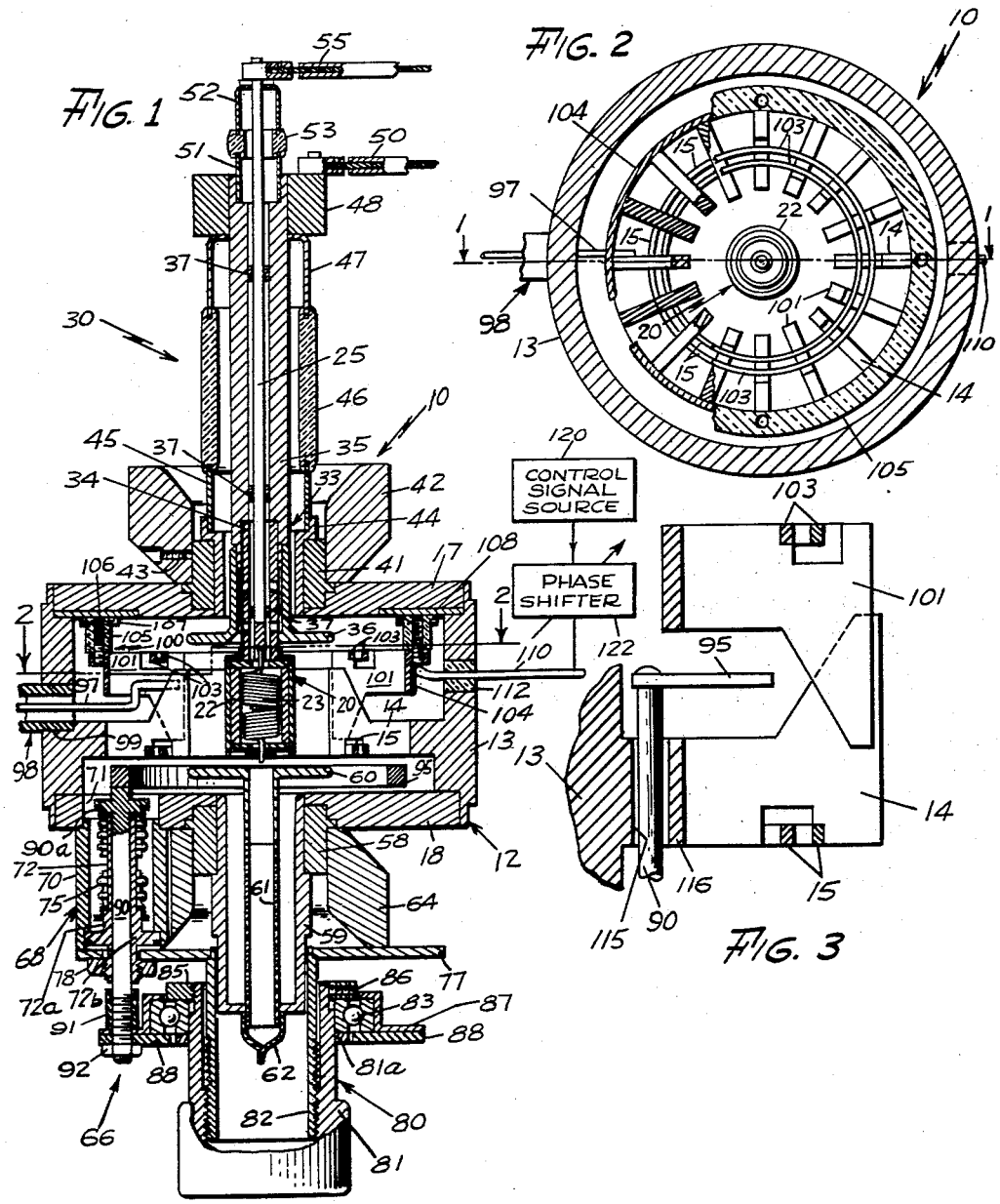
INVENTOR
ALBERT D. LaRUE
BY Elmer J. Gorn
ATTORNEY

2,922,075
RESONANT GRID MAGNETRONS

Albert D. La Rue, Los Altos, Calif., assignor to Raytheon Company, a corporation of Delaware Application March 27, 1958, Serial No. 724,560

13 Claims. (Cl. 315—39.63)

This invention relates to an electron discharge device of the magnetron type, and, more particularly, to a magnetron including a grid structure which is resonant at or near the magnetron pi-mode operating frequency and which is capable of producing a high frequency field configuration suitable for effecting frequency control of the magnetron.

As is well known in the magnetron art, the tuned anode circuit of a magnetron provides a radio-frequency field in which, for pi-mode operation, the alternate anode members are of identical radio-frequency potential and adjacent members are of opposite polarity at any given instant. In other words, a radio-frequency wave travels around the periphery of the anode resonant circuit at a velocity substantially equal to that of the rotating space charge cloud in the interaction space between the anode and cathode. The spatial periodicity of the radio-frequency field is equal to half the number of anode members.

The grid structure of the magnetron, according to the invention, is constructed so as to produce the same type of radio-frequency field as that existing in the usual magnetron during oscillation in the pi mode. Such a radio-frequency field may be produced if the adjacent grid elements combine to form part of a resonant system having the same number of resonant cavities, or members, as the anode resonant system. The grid tank circuit is similar to the usual anode tank circuit and may be meshed with the latter in such a way that both resonant systems act upon the space charge cloud in the interaction space, and, if either is excited, a radio-frequency field of the proper spatial periodicity results. If the grid circuit is driven properly, there will be a rotating radio-frequency field or wave traveling around the periphery of the anode structure in the same manner as the usual radio-frequency wave for the magnetron pimode. If the grid members are positioned midway between the anode members, the radio-frequency field of the grid resonant circuit would be displaced in space one quarter period from the radio-frequency field of the anode resonant circuit. This phase difference may be compensated for by displacing the radio-frequency excitation applied to the grid structure in time by a like phase difference.

The frequency variations observed during the modulation of a magnetron are believed to occur primarily owing to changes in the synchronous velocity of the rotating space charge cloud; that is, the pi-mode frequency is thought to be determined not only by the resonant characteristic of the anode resonant circuit and the load characteristic, but also by the condition of the space charge. In general, higher anode voltages and higher anode currents tend to increase the rotational velocity of the space charge cloud, thereby increasing the oscillation frequency. Since synchronism must exist between the velocity of the rotating space charge cloud and the velocity of the radio-frequency traveling wave, it follows that the velocity of the radio-frequency wave is, to some extent, a function of the space charge itself, the rotating spokes of which it helps to create. The rotating space charge cloud in the resonant grid magnetron may be influenced by a radio-frequency wave induced in the grid tank circuit from an external source so that synchronism is maintained at the excitation frequency. The driving frequency would not be affected by the magnetron anode voltage or current; as a matter of fact, the magnetron anode voltage and current changes would tend to correct any tendency to change the velocity of the rotating space charge cloud.

The grid current may be held to low values by positioning the grid elements facing the space charge on a diameter somewhat larger than that of the anode; furthermore, the grid current may be reduced by biasing the grid structure negative with respect to the anode structure.

Tuning of the magnetron may be accomplished mechanically by a tuner structure disposed in the vicinity of the anode structure. In some cases, a dual tuning system may be used, in which the tuning structure is located between the grid and anode resonant circuits in the region of high radio-frequency magnetic field. When such a dual tuner is moved, the tuning action is such that one resonant circuit will be tuned to higher frequencies, while the other resonant circuit is tuned to lower frequencies; such a device may be used in fixed tuned resonant grid magnetrons where it is desirable to resonate both tank circuits to the same frequency, thus overcoming small variations in frequency arising from asymmetry in the magnetron structure.

The system above-described will oscillate provided the anode voltage is sufficiently high. If the anode voltage is below a value adjacent the Hartree voltage, the system will function as an amplifier of input energy supplied to the grid tank circuit.

Further objects and advantages of this invention will become apparent with reference to the specification and the drawing wherein:

Fig. 1 is a central cross-sectional view, partly in elevation, of a resonant grid magnetron according to the invention;

Fig. 2 is a top-sectional view taken along line 2—2 of Fig. 1 of the magnetron according to the invention; and Fig. 3 is a detail view of a modification of the tuning means of the device shown in Figs. 1 and 2.

Referring now to the drawing, numeral 10 designates a magnetron-type electron discharge device having an anode structure 12 of well-known design and including a cylindrical body 13 of an electrically-conductive material, such as copper, and a plurality of radially disposed, inwardly extending anode members 14 in the form of electrically-conductive vanes attached to said body. Each pair of adjacent anode members 14, together with that portion of the cylindrical body included therebetween, at least partially defines a cavity resonator; these resonators are electrically intercoupled in the usual manner. Alternate anode members are interconnected adjacent their innermost ends by straps 15 in order to prevent spurious oscillations of the magnetron in undesired modes. The anode structure 12 further includes upper and lower cover plates 17 and 18, respectively, which are secured to the anode cylinder 13.

A cathode structure 20 is positioned concentric with anode structure 12, as shown in Fig. 1, and includes a cathode sleeve 22 which may be coated with an electron-emissive material, in the well-known manner. The cathode structure 20 further includes a heater element 23 positioned within cathode sleeve 22 and connected at one end thereto. The other end of heater element 23 is attached to a heater lead-in wire 25 which extends through the cathode support structure 30. The cathode support structure includes an elongated tubular subassembly 33 consisting of a first hollow cylinder 34 to which the cathode sleeve 22 is attached and a second hollow cylinder 35 connected to cylinder 34. The tubular subassembly 33 also includes a cathode end shield 36, attached at one end of cylinder 35 and having an annular end portion, the diameter of which is greater than that of the cathode sleeve 22, so as substantially to prevent movement of electrons axially upward from the space between the cathode and the anode members 14. The heater lead-in wire 25 is supported in electrically insulating relation within the hollow cylinders 34 and 35 of tubular subassembly 33 by glass beads 37.

Upper pole piece 41 of the magnetron magnetic field-producing means extends into an aperture in the cover plate 17 of anode assembly 12 and is fastened securely, as by brazing, to said cover plate. An upper pole piece adapter 42 is positioned about pole piece 41 and is held in place by one or more set screws 43. A C-shaped magnet, not shown, has one end thereof attached to, or in proximity with, the pole piece adapter 42. The cathode support structure 30 also includes a metal sleeve 44 rigidly fastened within pole piece 41 and having a slightly enlarged upper end portion to which is secured a short metal tube 45. A glass or ceramic seal 46 is attached at one end to metal tube 45 and at the other end to a metallic thimble 47. The hollow cylinder 35 of subassembly 33 is attached to this thimble. A cathode heat radiator 48 surrounds cylinder 35. A cathode lead 50 may be connected directly to the heat radiator 48, as shown in Fig. 1, or to some point along thimble 47. The cathode support structure 30 includes two ferrules 51 and 52 interconnected by a glass bead 53. Ferrule 51 is attached at one end to a hollow cylinder 35, while ferrule 52 is connected to the heater lead-in wire 25. A heater lead 55 is connected to the heater lead-in wire 25 and serves to supply appropriate heater voltage to the tube from an appropriate source, not shown.

The lower pole piece 58 of the magnetic field-producing means is attached to cover plate 18 of anode assembly 12. Positioned within the pole piece 58 is a tubular extension 59 which also fits within a central aperture in cover plate 18. A cathode end shield 60, similar in function to end shield 36 already described, is secured to an insulating sleeve 61, which may be made of ceramic, said sleeve extending through an aperture in the bottom of tubular extension 59 and being hermetically sealed thereto. An exhaust tip-off 62 is connected to the portion of the insulating sleeve 61 extending beyond the tubular extension 59. The lower pole piece 58 is surrounded by pole piece adapter 64 which may be secured to the pole piece 58, as by set screws, in the same manner that pole piece adapter 42 is mounted to upper pole piece 41. One end of the aforementioned C magnet is located in proximity with the pole piece adapter 64.

The tuning assembly 66 for tube 10 includes at least a plunger subassembly 68 which is positioned about the lower cover plate 18 of tube 10 and fits into a recess in pole piece adapter 64. Subassembly 68 includes a housing 70 whose upper end is attached hermetically to the inner periphery of an aperture 71 in anode cover plate 18. A hollow bearing sleeve 72 is disposed within the housing 70; one end of a flexible bellows 75 is attached to portion 72a of bearing sleeve 72. The other end of bellows 75 is secured to a metal cup which, in turn, is attached to an enlarged portion 90a of a tuning plunger 90, to be described in greater detail subsequently. The flange 72b of the bearing sleeve 72 is secured to the housing 70. Bearing sleeve 72 further includes an externally threaded portion contiguous to the flange 72b which passes through an aperture in annular plate 77; this portion threadedly engages a lock nut 78 bearing against the underside of annular plate 77.

The tuning knob assembly 80 includes an internally threaded tuning knob 81 engaging an externally threaded sleeve 82 which is attached, by way of the annular plate 77, to the tuner pole piece adapter 64. The upper end of the tuning knob 81 includes a projecting portion 81a upon which a ball bearing 83 partially seats. Tuning knob 81 also contains an externally threaded portion which engages a threaded bearing retainer ring 85; ring 85, after being screwed into position over bearing 83, is locked against rotation relative to the tuning knob 81 by means of one or more set screws 86. An upper bearing plate 87 and lower bearing plate 88 fit over the bearing 83 and are affixed rigidly to the threaded portion of tuning plunger 90 by means of nuts 91 and 92. As the tuning knob 81 is rotated, it moves parallel to the longitudinal axis of tube 10, and carries with it the bearing retainer means 85, 87, 88, thereby imparting axial movement to the tuning plunger 90. As the tuning plunger 90 slidably moves within bearing sleeve 72, the position of an inductive tuner ring 95, secured to the upper end of tuning plunger 90, is varied. This mechanical adjustment of tuner ring 95 produces a change in the frequency-determining parameters of the anode resonant circuit 12. Adjustment of the extremities of motion of tuner ring 95 and leveling of the tuner ring may be accomplished by proper adjustment of nuts 91 and 92.

An output coupling lead 97 is attached to one of the anode members 14 and an extension of this lead forms the inner conductor of a coaxial line 98 whose outer conductor 99 is inserted in an aperture in anode cylinder 13.

Tube 10 includes a grid structure 100 comprising a multiplicity of grid members 101 of substantially the same construction as the anode members 14. The various grid members 101 are positioned between corresponding anode members in the manner shown in Fig. 2. As in the case of the anode members 14, alternate grid members 101 are interconnected adjacent their inner ends by straps 103. The grid structure 100 must be insulated electrically from the anode structure 12. This isolation of the grid and anode resonant structures is achieved by attaching the innermost portion of grid members 101 to a supporting ring 104, which, in turn, is secured to ceramic support insulators 105 by screws 106 passing through both the supporting ring and the support insulators. The support insulators 105 include a slightly enlarged end portion to which is secured a metallic shell 107; the latter is bonded to a flat ring 108, which is trapped within a recess in upper anode cover plate 17, between said cover plate and a ledge of the anode cylinder 13 prior to assembly of the cover plate to the anode cylinder. The metallic shell 107 is used to permit a good ceramic-to-metal seal to be made between the grid support insulator 105 and ring 108. A grid lead 110 extends into the interior of tube 10 through an insulating bushing 112 and is connected to some point on the grid structure, such as the supporting ring 104. A control signal from an appropriate source 120 is applied by way of a phase shift network 122 to the grid lead 110. If the grid members are spaced midway between the adajcent anode members, and pi-mode operation is assumed, the radio frequency potential of a grid member, at any given instant, would, in the absence of grid excitation, be approximately midway between the potential of the anode members on either side of said grid member. In this event, the signal applied to the grid structure 100 would be shifted approximately 90 electrical degrees by phase shift network 122. The amount of phase shift would depend, to a large extent, upon the relative position of the members of the grid and anode structure.

It should be noted that the anode and grid members 14 and 101 are shallower at the back end thereof than at the end nearer the cathode; this design reduces the magnetic coupling, predominantly near the back end of the various members, between anode cavity resonators, and the grid cavity resonators to minimize interaction therebetween the resonant grid structure and the resonant anode structure.

An example of a dual tuning system wherein both the anode and grid-type circuits may be tuned simultaneously is shown in Fig. 3. The tuner ring 95 is mounted in the space between grid members 101 and anode members 14 and is moved axially in response to movement of the tuning plunger 90 within aperture 115 in the extension 116 of anode cylinder 13.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein except as defined by the appended claims.

What is claimed is:

1. A magnetron comprising a resonant anode structure having a radio frequency field disposed in the vicinity thereof, and a frequency controlling resonant grid structure meshed with said anode structure and of similar construction to that of said anode structure, said grid structure having a radio frequency field in the vicinity thereof which is of substantially the same character as that existing in the vicinity of said anode structure.

2. A magnetron comprising a resonant anode structure, a resonant grid structure meshed with said anode structure and being of similar construction to that of said anode structure, means including a cathode for directing electrons in the region between said cathode and said anode structure, and means responsive to a control signal applied to said grid structure for controlling the frequency of operation of said magnetron.

3. A magnetron comprising a resonant anode structure, a resonant grid structure meshed with said anode structure, means including a cathode for directing electrons in the region between said cathode and said anode structure, means responsive to a control signal applied to said grid structure for controlling the frequency of operation of said magnetron, and tuner means for adjusting the resonant frequency of said anode structure.

4. A magnetron comprising a resonant anode structure, a resonant grid structure meshed with said anode structure, means including a cathode for directing electrons in the region between said cathode and said anode structure, means responsive to a control signal applied to said grid structure for controlling the frequency of operation of said magnetron, and tuner means for adjusting simultaneously the resonant frequency of said resonant anode structure and said resonant grid structure.

5. A magnetron comprising a resonant anode structure having a plurality of spaced anode members, a resonant grid structure including a plurality of spaced grid members positioned intermediate said anode members, means including a cathode for producing a space charge cloud of electrons in the region between said cathode and said anode structure, and means for producing in the region of said grid structure a high frequency electromagnetic field modifying said space charge cloud in response to a control signal applied to said grid structure.

6. A magnetron comprising a resonant anode structure having a plurality of spaced anode members, a resonant grid structure including a plurality of spaced grid members positioned between said anode members, means including a cathode for producing a space charge cloud of electrons in the region between said cathode and said anode structure, means for producing in the region of said grid structure a high frequency electromagnetic field modifying said space charge cloud in response to a control signal applied to said grid structure, and means for deriving an output signal from said anode structure, said control signal being displaced in time phase with respect to said output signal by an amount dependent upon the relative position of said anode and grid members.

7. A magnetron comprising a resonant anode structure having a plurality of spaced anode members, a resonant grid structure including a plurality of spaced grid members positioned substantially midway between said anode members, means including a cathode for producing a space charge cloud of electrons in the region between said cathode and said anode structure, means for producing in the region of said grid structure a high frequency electromagnetic field modifying said space charge cloud in response to a control signal applied to said grid structure, and means for deriving an output signal from said anode structure, said control signal being displaced substantially ninety electrical degrees in time phase with respect to said output signal.

8. A magnetron adapted to operate at a predetermined frequency, comprising a resonant anode structure having a plurality of spaced anode members, said anode structure having a high frequency electromagnetic field associated therewith, a resonant grid structure including a plurality of spaced grid members positioned intermediate said anode members, means including a cathode for directing electrons along the region between said cathode and said anode structure, and means responsive to a control signal of said predetermined frequency applied to said grid structure for producing in the region of said grid structure a high frequency electromagnetic field substantially continuous with said field associated with said anode structure.

9. A magnetron comprising a resonant anode structure having a plurality of spaced anode members, a resonant grid structure including a plurality of spaced grid members equal in number to the number of anode members, said grid members being positioned intermediate said anode members, means including a cathode for producing a space charge cloud of electrons in the region between said cathode and said anode structure, and means for producing in the region of said grid structure a high frequency electromagnetic field modifying said space charge cloud in response to a control signal applied to said grid structure.

10. A magnetron comprising a resonant anode structure having a plurality of spaced anode members, a resonant grid structure including a plurality of spaced grid members positioned intermediate said anode members, means including a cathode for producing a space charge cloud of electrons in the region between said cathode and said anode structure, means for producing in the region of said grid structure a high frequency electromagnetic field modifying said space charge cloud in response to a control signal applied to said grid structure, the portions of said grid members facing said cathode being disposed further from said cathode than the corresponding portions of said anode members.

11. A magnetron comprising a resonant anode structure having a plurality of spaced anode members, a resonant grid structure including a plurality of spaced grid members positioned intermediate said anode members, means including a cathode for producing a space charge cloud of electrons in the region between said cathode and said anode structure, means for producing in the region of said grid structure a high frequency electromagnetic field modifying said space charge cloud in response to a control signal applied to said grid structure, and tuner means for adjusting simultaneously the resonant frequency of said resonant anode structure and said resonant grid structure.

12. A magnetron comprising a resonant anode structure having a plurality of spaced anode members, a resonant grid structure including a plurality of spaced grid members positioned intermediate said anode members, means including a cathode for producing a space charge cloud of electrons in the region between said cathode and said anode structure, said anode and grid members having a configuration in the region remote from said cathode which is smaller than that of the remainder of corresponding ones of said anode and grid members, and means for producing in the region of said grid structure a high frequency electromagnetic field modifying said space charge cloud in response to a control signal applied to said grid structure.

13. A magnetron comprising a resonant anode structure, a resonant grid structure meshed with said anode structure and being of similar construction to that of said anode structure, and means including a cathode for directing electrons in the region between said cathode and said anode structure.

References Cited in the file of this patent

UNITED STATES PATENTS

| | | |
|---|---|---|
| 2,585,741 | Clogston | Feb. 12, 1952 |
| 2,679,615 | Bowie | May 25, 1954 |
| 2,765,424 | Wheeler | Oct. 2, 1956 |
| 2,784,345 | Spencer | Mar. 5, 1957 |
| 2,810,095 | Peters et al. | Oct. 15, 1957 |
| 2,826,719 | Donal | Mar. 11, 1958 |